United States Patent

Bryant

[11] Patent Number: 6,165,584
[45] Date of Patent: Dec. 26, 2000

[54] WOOL-LIKE RUGS AND PROCESSES FOR MAKING THE SAME

[75] Inventor: Christopher S. Bryant, Dalton, Ga.

[73] Assignee: Shaw Industries, Inc., Dalton, Ga.

[21] Appl. No.: 09/228,919

[22] Filed: Jan. 11, 1999

[51] Int. Cl.$^7$ .................... B32B 3/02; D06P 7/00
[52] U.S. Cl. .................... 428/96; 428/97; 8/483; 8/497
[58] Field of Search ............ 428/96, 97; 8/483, 8/497

[56] References Cited

U.S. PATENT DOCUMENTS

| | | | |
|---|---|---|---|
| Re. 35,108 | 12/1995 | Hagen et al. ............ | 264/176.1 |
| 3,900,623 | 8/1975 | Hatt ........................ | 428/92 |
| 4,375,197 | 3/1983 | Hinson .................... | 112/266.2 |
| 5,160,347 | 11/1992 | Kay et al. ................ | 8/481 |
| 5,223,317 | 6/1993 | Corin et al. ............. | 428/92 |
| 5,343,600 | 9/1994 | Peykar .................... | 28/143 |
| 5,468,259 | 11/1995 | Sheth et al. ............. | 8/497 |
| 5,550,192 | 8/1996 | Sheth et al. ............. | 525/194 |
| 5,576,366 | 11/1996 | Sheth et al. ............. | 524/140 |

*Primary Examiner*—Christopher Raimund
*Attorney, Agent, or Firm*—Needle & Rosenberg, P.C.

[57] ABSTRACT

A rug exhibiting a wool-like appearance made by the process comprising the steps of a. extruding a dyeable polyolefin resin comprising the reaction product of a polypropylene and an ethylene alkyl acrylate copolymer to provide an extruded fiber; b. drawing the extruded fiber by conveying the fiber among a system of unheated and heated godets; c. crimping the drawn fiber by passing the fiber into a texturing jet utilizing hot air; d. twisting at least two separate drawn and crimped fibers to provide a multi-ply carpet face yarn wherein the yarn is from about 1000 to about 8000 denier and has about 2 to about 7 twists per inch; e. heat-setting the multi-ply yarn; f. dyeing the multi-ply yarn using a space-dyeing process; and g. weaving the dyed yarn into a rug; thereby providing a rug with a wool-like appearance. The invention also provides a process for making a rug with a wool-like appearance.

18 Claims, No Drawings

WOOL-LIKE RUGS AND PROCESSES FOR MAKING THE SAME

BACKGROUND OF THE INVENTION

1. Field of the Invention

The present invention relates to rugs. In particular, the present invention provides rugs that exhibit a wool-like appearance. Additionally, the invention provides processes for fabricating a wool-like rug.

2. Background of the Invention

Patterned rugs crafted from wool are highly desirable to many consumers, especially in light of the return to natural wood floors in residential and commercial interiors seen in recent years. "Antiqued" or "old" patterned wool rugs, whether aged naturally through time and wear, or fabricated to exhibit an antique-like appearance, are even more desirable, as this style approximates the appearance of an expensive heirloom piece. Such rugs are also commonly known as "oriental rugs." An "antique" rug is a rug produced more than 20 years ago. The category is further divided into "old" rugs, i.e., those manufactured at or before 1900, and "modern" rugs i.e., those manufactured since 1900.

The cost of patterned or oriental-type wool rugs is often quite high, however. For example, a true antique or old wool rug can command a price of many thousands of dollars if in good condition. Even when new wool rugs are crafted by machine-looming and/or machine-dyeing to lessen labor costs, the rugs remain expensive, due to, among other reasons, the high cost of wool which, at 1998 market prices, sells for upwards of $3.50/lb. Furthermore, raw wool requires substantial pre-processing to minimize naturally occurring defects, which further increases the final cost of a wool rug to the consumer.

Because of the high cost of wool rugs, attempts have been made to fabricate such rugs from synthetic resins, such as polyolefins, e.g., polypropylene. The pre-dye price for polyolefin yarn used to make rugs is approximately $1/lb. This difference in price translates to a final cost of $50 to $600 for a rug made from polyolefin fibers, as compared to an approximate cost of $1,500 to $4,000 finished cost for a patterned rug made from wool.

However, manufacturers have been unable to successfully duplicate the look of patterned wool rugs using synthetic fibers, such as polyolefin. One reason for this is that, as a product with naturally-occurring, inter-fiber variability, wool fiber experiences differing amounts of dye uptake even among a single lot of wool. Therefore, when differently colored wool fibers are woven into a rug, the rug will often exhibit a multitude of color variations even among fibers dyed with the same dye shade. Thus, it is common for a dyed wool rug to be comprised of very subtle shade differences throughout the product. The consumer expects such color variations in wool rugs and considers them to be more "natural looking." A naturally aged wool rug will exhibit even more natural color variation due a to loss of color intensity resulting from the aging process.

In contrast, no such natural-looking color variability has been attainable previously in rugs woven from polyolefin fibers. Fibers made from polyolefin resin are produced under controlled and reproducible chemical conditions. Pigmentation is consistent both within and among lots of fiber. Such consistency in coloration is considered by the consumer to be "unnatural-looking" and, as such, undesirable in a simulated wool rug.

In some synthetic fibers, such as nylon, a more natural-looking dyed fiber may be attained using space-dyeing techniques. Knit-de-knit space-dyeing is a technique in which fibers are knitted into a sock, color is added to the surface of the fibers by, for example, print rolls, and the fibers are deknitted to form single fibers that will have different colors dispersed somewhat randomly along the fiber length. When the multi-colored fiber is incorporated into a carpet, the coloration of the carpet will appear more random and, thus, more natural-looking. Using this technique, the random coloration possible with wool fibers may be approximated in some synthetic fibers.

However, polyolefin e.g., polypropylene fibers, are not amenable to dyeing with such methods due to the lack of reactive groups in the resin which prevents surface dyes, such as acid dyes, from adhering to the fiber. Thus, it is not possible to durably dye polyolefin fibers using space-dyeing techniques. Because of the lack of reactive groups in polyolefin fibers, the fibers arc normally colored during the extrusion process, e.g., solution dyed, which also maximizes the uniformity of color deposition throughout the fiber. This results in polyolefin having been considered an undesirable fiber-type for use in simulated wool patterned rugs.

Despite the difficulties experienced in obtaining natural-looking dyed polyolefin rugs, polyolefin remains a desirable material from which to fabricate rugs. For example, as compared to wool fibers, polyolefin fibers exhibit superior resistance to chemicals, sunlight, mildew, moisture, moths and abrasion. Further, polyolefin fibers are of lower density than wool and can be thermoset.

In light of the above, it would be desirable to be able to fabricate rugs from dyeable polyolefin fibers wherein the rugs are natural-looking and wool-like in appearance. Moreover, it would be desirable to fabricate natural-look, wool-like rugs, wherein the rugs, when dyed and woven from polyolefin fibers, exhibit a look similar to patterned or oriental-type rugs made from natural wool.

SUMMARY OF THE INVENTION

A rug is provided that exhibits a wool-like appearance made by the process comprising the steps of: a. extruding a dyeable polyolefin resin comprising the reaction product of a polypropylene and an ethylene alkyl acrylate copolymer to provide an extruded fiber; b. drawing the extruded fiber by conveying the fiber among a system of unheated and heated godets; c. crimping the drawn fiber by passing the fiber into a texturing jet utilizing hot air; d. twisting at least two separate drawn and crimped fibers to provide a multi-ply carpet face yarn wherein the yarn is from about 1000 to about 8000 denier and has about 2 to about 7 twists per inch; e. heat-setting the multi-ply yarn; f. dyeing the multi-ply yarn using a space-dyeing process; and g. weaving the dyed yarn into a rug; thereby providing a rug with a wool-like appearance.

Still further, the invention provides a process for making a rug with a wool-like appearance comprising the steps of: a. extruding a dyeable polyolefin resin comprising the reaction product of a polypropylene and an ethylene alkyl acrylate copolymer to provide an extruded fiber; b. drawing the extruded fiber by conveying the fiber among a system of unheated and heated godets; c. crimping the drawn fiber by passing the fiber into a texturing jet utilizing hot air; d. twisting at least two separate drawn and crimped fibers to provide a multi-ply carpet face yarn wherein the yarn is from about 1000 to about 8000 denier and has about 2 to about 7 twists per inch; e. heat-setting the multi-ply yarn; f. dyeing the multi-ply yarn using a space-dyeing process; and g. weaving the yarn into a rug; thereby providing a rug with a wool-like appearance.

Additional advantages of the invention will be set forth in part in the description which follows, and in part will be apparent from the description, or may be learned by practice of the invention. The advantages of the invention will be realized and attained by means of the elements and combinations particularly pointed out in the appended claims. It is to be understood that both the foregoing general description and the following detailed description are exemplary and explanatory only and are not restrictive of the invention, as claimed.

DETAILED DESCRIPTION OF THE INVENTION

The present invention may be understood more readily by reference to the following detailed description of preferred embodiments of the invention.

Before the present articles and methods are disclosed and described, it is to be understood that the terminology used herein is for the purpose of describing particular embodiments only and is not intended to be limiting. It must be noted that, as used in the specification and the appended claims, the singular forms "a," "an" and "the" include plural referents unless the context clearly dictates otherwise.

Throughout this application, where publications are referenced, the disclosures of these publications in their entireties are hereby incorporated by reference into this application in order to more fully describe the state of the art to which this invention pertains.

Ranges are often expressed herein as from about one particular value, and/or to about another particular value. When such a range is expressed, it is to be understood that another embodiment is from the one particular value and/or to the other particular value. Similarly, when values are expressed as approximations, by use of the antecedent "about," it will be understood that the particular value is another embodiment.

As used herein, the terms "modified polyolefin fiber" and "dyeable polyolefin fiber" are used interchangeably to mean fibers made from polyolefin-containing resin wherein the resin further comprises additives which improve the dyeability of fibers made from the resin. Preferably, the modified or dyeable polyolefin resin herein comprises compositions described in U.S. Pat. Nos. 5,468,259, 5,550,192 and 5,576,366, the disclosures of which, including the preferred compositions therein, are incorporated herein in their entireties.

The present invention provides in one aspect a rug exhibiting a wool-like appearance made by the process comprising the steps of: a. extruding a dyeable polyolefin resin comprising the reaction product of a polypropylene and an ethylene alkyl acrylate copolymer to provide an extruded fiber; b. drawing the extruded fiber by conveying the fiber among a system of unheated and heated godets; c. crimping the drawn fiber by passing the fiber into a texturing jet utilizing hot air; d. twisting at least two separate drawn and crimped fibers to provide a multi-ply carpet face yarn wherein the yarn is from about 1000 to about 8000 denier and has about 2 to about 7 twists per inch; e. heat-setting the multi-ply yarn; f. dyeing the multi-ply yarn using a space-dyeing process; and g. weaving the yarn into a rug with a wool-like appearance. In a particularly preferred embodiment, in step e of the above embodiment, the yarn is from about 1400 denier to about 1500 denier and has about 3 to about 6 twists per inch. As used herein, the terms "wool-like" and "wool-like appearance" mean rugs which exhibit a hand or appearance simulating that of patterned or oriental-type rugs fabricated from natural wool.

In one embodiment of the invention herein, the dyeable polyolefin resin comprises the reaction product of a polypropylene and a copolymer of ethylene alkyl acrylate. In one embodiment, such a resin is believed to be made dyeable by, for example, the grafting of an ethylene alkyl acrylate copolymer onto a polypropylene resin backbone via graft copolymerization. Alternatively, the ethylene alkyl acrylate copolymer may be blended with the polypropylene. In another preferred embodiment, the resin comprises a polyester and a hydrophilic modifier. In another preferred embodiment, the resin comprises a polyamide. An example of a resin particularly suitable for practice of this invention is supplied as Equistar 37L18VX0468, available from Equistar, Sugarland, Tex. This resin is a polypropylene-ethyl acrylate copolymer.

In yet a further embodiment, the extrusion, the drawing and the texturing of the fiber is done in a "one step" process. In another embodiment, the extrusion step is separate from the drawing and the texturing steps; this separate procedure is known as a "two step" process.

In a further preferred embodiment of the invention, a color concentrate is dosed into the extruder along with the dyeable polyolefin resin. One of skill in the art will recognize the manner in which color concentrates, e.g., dyes or pigments, may be added to the resin. An example of a particularly preferred color concentrate, which is compounded in a polypropylene resin, is manufactured by Shaw Industries, Inc., Bainbridge, Ga.

In yet a further embodiment of the invention herein, the extrusion step comprises the steps of: a. conveying the resin through the extruder wherein the resin is passed through zones comprising a series of increasing temperatures; b. passing the resin through a multitude of spinnerettes comprising a multiplicity of holes configured in a delta shape wherein the spinnerettes are adjusted to produce a number of extruded fibers; and c. cooling the extruded fibers by passing the fibers through an air stream. In one embodiment of step (a) above, the resin is passed through a number of zones of differing temperatures. In a particularly preferred embodiment of step (a) above, the resin is conveyed through an extruder comprising a multitude of zones of temperatures ranging from about 195° C. to about 225° C. In a further particularly preferred embodiment, the number of zones is about 7.

In yet another embodiment, the fiber is formed by passing the dyeable polyolefin resin through a number of spinnerettes configured with about 50 to 200 holes each, with 80 holes being particularly preferred, wherein the holes are preferably of a delta shape. Further preferred shapes for the spinnerettes are, for example, round, or tri-lobal. In a preferred embodiment, the multitude of spinnerettes comprises about sixteen, with there being two spinnerettes per position and eight positions per line.

In a further preferred embodiment, the through-put of the resin through the spinnerettes is adjusted to produce a finished fiber size of about 1000 to 16000 denier with 2500 to 4500 denier being particularly preferred. One of skill in the art will recognize that, at this stage of the process, the fiber exiting the spinnerette is larger than the finished fiber size to account for changes in fiber size which result from the fiber processing steps that occur later in the process.

In a further embodiment, after exiting the spinnerettes, the extruded fibers are passed into a quench stack operated at a temperature of about 10.0 to about 16.0° C. at an air velocity of about 550 to about 850 feet per minute. In this quenching step, air is blown over the multiplicity of fibers to cool the extruded fiber.

In another embodiment, the invention comprises applying a finish to the extruded fiber prior to the drawing step. One of skill in the art would understand what types of finishing agents are considered to be suitable for the applications herein. Preferably, the finish is applied in an amount of about 1.0 to about 1.5% by weight of finish to fiber. In a more preferred embodiment, a finish is applied to the fiber in an amount of about 1.1 to about 1.2% as measured by weight of fiber.

In one embodiment of the invention, the drawing step comprises: a. feeding the fiber onto at least one first unheated godet wherein the fiber is drawn around the first godet; b. feeding the fiber onto at least one heated second godet wherein the second godet is operated at a temperature of about 80° C. to about 90° C. and wherein the fiber is drawn around the second godet; c. feeding further the fiber onto at least one heated third godet wherein the third godet is operated at a temperature of about 120° C. to about 130° C. and wherein the fiber is drawn around the third godet; and d. feeding the fiber on to at least one unheated fourth godet onto which the fiber is wrapped wherein the drawn fiber has a draw ratio of less than about 3.0. As used herein, the term "draw ratio" means the ratio of final to original length per unit of weight of yarn resulting from the drawing process.

In a preferred embodiment, the first godet comprises a set of feed godets operating at about 900 to about 1000 m/min (meters per minute), preferably at about 940 m/min, without the application of heat. The fiber is wrapped around the first godet set about 5 to about 7 times and, preferably about 6 times. In a further preferred embodiment, the fiber is conveyed onto the heated second godet, which comprises a set of pre-draw godets operating at about 900 to about 1000 m/min, preferably about 960 m/min, and that are heated to about 80° C. to about 90° C. and preferably, about 85° C. The fiber is wrapped around this second godet about 7 to about 10 times and, preferably, about 8 times. The fiber, in yet a further preferred embodiment, is conveyed from the second godet to a third godet which operates at about 2200 to about 2500 m/min, preferably about 2300 m/min and is heated to about 120 to about 130° C., preferably about 123° C. In this latter embodiment, the fiber is wrapped around the third godet. The speed differential between the second and third godets results in a preferred draw ratio in the fiber of less than about 3. In a most preferred embodiment, the draw ratio of the drawn fiber is about 2.4. In a further preferred embodiment, the drawn fiber is conveyed to a fourth godet where the fiber is wrapped about 5 to about 7 times, preferably about 6 times at a speed of about 1800 to 2000, preferably about 2000 m/min with the application of little or no heat. One of skill in the art will recognize that these drawing conditions can be varied without affecting the novelty and unobviousness of the invention.

In a further embodiment of the invention, the process comprises feeding the drawn fiber into a texturing jet utilizing hot air to crimp the fibers to provide a bulked fiber. Preferably, a texturing jet is utilized to crimp the fiber wherein the jet is of a split-type operating at about 8 to about 10 bar hot air pressure and about –20 mbar exhaust. In a further preferred embodiment, the crimped fiber is taken up on a sieve (perforated) drum through which air is pulled to provide further cooling to the fiber. The fiber is then preferably removed from the drum by taking upon on a tube via a winder to form a package.

In a further embodiment, two fibers wound on separate packages are preferably subjected to a twisting step to form a multi-ply yarn, wherein the twisting step comprises threading at least two separate crimped fibers onto a twister device. Preferably, one package of about 500 to about 4000 denier single-ply fiber is placed in a pot and another is placed in a creel. One twister is then preferably threaded with two fibers to provide a two-ply yarn of about 1000 to about 8000 denier with about 2 to about 7 twists per inch, preferably 2 times 1400 to about 1500 denier and about 3 to about 6 twists per inch. In a preferred embodiment, the creel and pot tensions are set at about 575 to about 625 grams and the twister spindle speed is about 5000 to about 8000 revolutions per minute. In a more preferred embodiment, the spindle speed is about 6600 to about 7000 revolutions per minute. In one embodiment, which is particularly preferred, the fibers are twisted on a wide gauge twister such as a Volkmann, available from Volkmann, Krefield, Germany.

In a separate preferred embodiment, a dyeable polyolefin fiber prepared according to the methods herein is twisted with at least one other type of fiber to form a multi-ply yarn comprised of at least two different fiber-types. In a further embodiment, the at least one other fiber twisted with the dyeable polyolefin fiber can comprise one or more of the following: standard polyolefin, polyamide (nylon), polyester, or wool. By "standard polyolefin" it is meant polyolefin not comprised of the dyeable polyolefin resin disclosed herein.

In yet another embodiment, the heat setting step comprises: a. feeding a package of twisted yarn onto a conveyor belt; b. conveying the yarn through a pre-steamer station operating at a temperature of about 90° C. to about 110° C. for less than about 1 minute; c. conveying further the yarn to a heat-set station operated at a temperature of about 100° C. to about 150° C. and a pressure of about 2 to about 3 bar; d. cooling the yarn; and e. winding the yarn onto a spool to form a package. In a preferred embodiment of the heat-setting step, the twisted multi-ply yarn is placed in a creel which can hold about 36 packages of yarn simultaneously.

In a preferred embodiment, the ends of the yarn are conveyed into a heat-set line under a pre-tension of about 25 to about 35 grams. The yarn ends are then conveyed onto a coiler headset at a speed of about 250 to about 300 m/min. The yarn ends are then formed into a bundle and placed on a stainless steel belt. The yarn bundles arc conveyed through a pre-steamer station operating at about 90° C. to about 110° C. at a speed of about 10 to about 15 m/min wherein the fiber is bulked. The yarn is held in the pre-steamer station for less than about 0.5 minutes, preferably less than about 0.3 minutes. The yarn bundle is then preferably conveyed into a heat set tunnel wherein the tunnel is pressurized at about 2.0 to about 2.5 bar and operates at a temperature of about 100° C. to 150° C., and preferably about 125° C. to about 135° C. As a result of this heat-set step, the twisted configuration in the yarn is made permanent. The yarn then exits the tunnel and passes over a form operating under the belt to pull air through the yarn to provide cooling. After the cooling step, the yarn is preferably wound under about 18 to about 22 grams of pressure to form a package of 1450×2 yarn.

In the preferred space dyeing process, the yarn packages are placed in a creel rack that is capable of holding up to about 48 yarn packages at a time. Each yarn end is threaded across guides to a dye applicator wherein the dye application consists of up to about 8 individual dye pans with a roller in each pan. In a particularly preferred embodiment, about 3 colors per yarn are used. The roller picks up the dye from the pan for transfer to the yarn. While the yarn is being threaded across the dye pans, a press bar is utilized to press the yarn down on the dye rollers at predetermined distances along the fibers. In a particularly preferred embodiment, the dye colors will be spaced at intervals of about 6 feet apart. However, one of skill in the art will recognize that the number of colors per fiber and the spacing of color along the fiber will vary according to the desired results to be found in the final product.

The yarn then exits the applicator and passes into a presteamer to preferably provide a degree of fixation of the dye to the yarn. The yarn is then coiled on a belt which moves at a rate of about 2 feet to about 6 feet and, preferably, about 4 feet per minute. The coiled yarn is then steamed for about 8 to about 12 minutes at about 190 to about 225° F., preferably about 205° F. to about 215° F. in order to fix the dye on the yarn.

The coiled yarn is then preferably passed through a hot (approximately 130 to about 150° F.) water spray to remove the unfixed dye. A spin finish, for example, Synthalube TXB50 (Piedmont Chemical Co., East Point, Ga.) at about 0.5% wt %, is preferably applied to the fiber. This finish reduces static electricity and provides lubrication to the fiber.

The yarn is then passed through a dryer that preferably comprises about 4 zones maintained at different temperatures. The dryer may preferably be operated at about 235° F., 230° F., 225° F., and 220° F., respectively. The dwell time of the yarn in the dryer is approximately about 7 to about 9 minutes and, most preferably about 7.5 minutes. The coiled yarn then continues until cooled, for example, about 10 to about 20 feet.

The coiled yarn is then separated into the individual yarns and wound onto tubes to make packages of dyed yarn.

The dyed yarn is then woven into, for example, an area rug thereby providing a rug with a wool-like appearance. One of skill in the art will recognize the various weaving techniques that can be utilized to weave the fibers prepared according to the methods herein.

In an additional embodiment, the invention provides a process for making a rug with a wool-like appearance comprising the steps of: a. extruding a dyeable polyolefin resin comprising the reaction product of a polypropylene and an ethylene alkyl acrylate copolymer to provide an extruded fiber; b. drawing the extruded fiber by conveying the fiber among a system of unheated and heated godets; c. crimping the drawn fiber by passing the fiber into a texturing jet utilizing hot air; d. twisting at least two separate drawn and crimped fibers to provide a multi-ply carpet face yarn wherein the yarn is from about 1000 to about 8000 denier and has about 2 to about 7 twists per inch; e. heat-setting the multi-ply yarn; f. dyeing the multi-ply yarn using a space-dyeing process; and g. weaving the yarn into a rug; thereby providing a rug with a wool-like appearance.

The aspects of the invention described above with respect to the rug of this invention are also applicable to the processes of this invention.

Through practice of the invention herein, it has been surprisingly found that a wool-like rug, such as a patterned or an oriental-type wool rug, may be fabricated from yarn prepared from dyeable polyolefin fibers. Such rugs exhibit superior hand and appearance when compared to rugs produced from unmodified polypropylene fibers or other types of synthetic fibers.

Embodiments of the above-described processes and products are set forth in the following Example. Other features of the invention will become apparent from the following Example, which is for illustrative purposes only and is not intended as a limitation on the present invention.

EXPERIMENTAL

The following Example is put forth so as to provide those of ordinary skill in the art with a complete disclosure and description of how the articles and processes claimed herein are made and evaluated, and are intended to be purely exemplary of the invention and are not intended to limit the scope of what the inventors regard as their invention. Efforts have been made to ensure accuracy with respect to numbers (e.g., amounts, temperatures, etc.) But some errors and deviations should be accounted for. Unless indicated otherwise, parts are parts by weight, temperature is in ° C. or is at ambient temperature, and pressure is at or near atmospheric.

EXAMPLE 1

Extrusion

Equistar 37L18VX0468 polyolefin resin was conveyed from a silo to an extruder, where it was melted, mixed and further conveyed. A color concentrate was also dosed into the extruder at this time, in order to provide the desired base color and luster level to the finished yarn. The extruder profile was as follows:

zone 1: 195° C.
zone 2: 200° C.
zone 3: 205° C.
zone 4: 210° C.
zone 5: 215° C.
zone 6: 220° C.
zone 7: 225° C.

The resin was then passed through a screen shifter, a metering pump and into a spin beam. The spin beam temperature was maintained at 245° C. to keep the resin melted. A fiber was then formed by passing the resin through spinnerettes configured with 80 holes in a delta shape. There were two spinnerettes per position and eight positions per line. Once passed through the spinnerette holes, the extruded fiber was conveyed into a quench stack operating at a temperature of 12° C. and at an air velocity of 700 feet/minute.

After exiting the quench stack, the fiber was passed over a spin finish applicator which applied about 1.15% finish by weight of the fiber. The fiber was then sent onto a set of godets. The feed godet operated at approximately 940 m/min without heat and was wrapped 6 times with the fiber. The fiber was then sent to a set of pre-draw godets which operated at 960 m/min and were heated to 85° C. The fiber was wrapped 8 times on this set of godets. The fiber was then drawn between the pre-draw godet and the draw godet. The draw godet operated at 2300 m/min and was heated to 123° C. The fiber was wrapped 11 times on a draw godet. This speed difference provided about a 2.39 draw ratio for the fiber. The fiber was then sent to an unheated take off godet where it was wrapped 6 times at a speed of 2000 m/min.

The drawn fiber was then fed into a split type texturing jet operating at 9 bar hot air pressure and -20 mbar exhaust. The fiber was crimped in the texturing jet to add bulk to the fiber. The fiber was then taken up on a sieve drum operating at 150 m/min. Air was pulled through the fiber on the sieve drum to provide cooling. The textured fiber was then removed from the drum at the 7:00 o'clock position and was taken up on a tube via a winder to form a package.

Twisting

Two packages of dyeable polyolefin fiber extruded above were then subjected to a twisting step to make a two-ply yarn. A package of 1450 denier singles fiber prepared by the methods described above was placed in the pot and another was placed in the creel. A Volkmann twister was threaded up with two fibers to make a 1450 two-ply yarn with 4.5 twists per inch each comprising dyeable polyolefin fibers. The creel and pot tensions on the fibers were set at 605 grams. The spindle speed was 6690 revolutions per minute. After the fiber was twisted into a two-ply yarn with 4.5 twists per inch yarn, it was taken to heat-setting for further processing.

Heat-Setting

The twisted yarn made above was placed in a creel which held 36 packages of yarn at one time. The 36 ends of yarn were fed to the heat-set line under a pre-tension of 30 grams. The yarn was passed onto a coiler head at a yarn speed of 275 m/min. The coiler head provided a rope made of the 36 ends and set the ends on a stainless steel belt in a circular manner. The belt operated at a speed of 12.5 m/min. The yarn was conveyed via the belt into a pre-steamer to bulk the yarn at a temperature of 98° C. for a dwell time of approximately 0.24 minutes. Then the yarn continued on the belt into the heat-set tunnel which was pressurized at 2.2 bar to operate at a temperature of 132° C. The yarn was passed through the tunnel, at the high temperature to set the twisted configuration in the yarn. The yarn then exited the tunnel passing over a fan under the belt operating at 1000 rpm to pull air through the yarn for cooling. The yarn was then wound onto a tube under 20 grams of tension to form a package.

Space Dyeing

The yarn formed above was received by the dye house and space dyed using spacing patterns and colors to provide the visual appearance necessary for the finished rug. In this example, 48 yarn packages were placed in a creel rack. The yarn ends were then threaded across guides to a dye applicator. The dye applicator consisted of 8 individual dye pans with a roller in each pan. The 48 ends are each threaded simultaneously through the dye across the 8 pans of dye without touching the rollers. A press bar was then used to press the yarn on the dye rollers at predetermined computerized frequencies, in this Example, 6, 12, and 18 feet spacing lengths each of 3 colors per yarn. The yarn then exited the applicator and was passed into a presteamer wherein the dye was partially fixed to the yarn. The yarn was then coiled on a belt moving at about 4 ft/min (feet/minute). The coiled yarn passed through steamers for 8 to 12 minutes of dwell time at 208° F. in order to fix the dye on the fiber. Any excess unfixed dye was then washed off with a hot water spray (approximately 140° F.). The dyed yarn was then treated with a Spin Finish (0.5% owf Synthalaube TXB50, Piedmont Chemical Industries, High Point, N.C.), with the finish applied by a spraybar. The dyed treated fiber was then dried for about 7.5 minutes at a series of temperatures ranging from 220° F. to 235° F. The yarn was then cooled, uncoiled and re-wound to form packages of dyed yarn. The yarn was shipped to the rug manufacturing plant after dyeing for weaving into the rugs.

Examination

Yarn prepared and dyed according to the above example were tested for color characteristics.

| Color I.D. | Xenon (40 hr.) | wet crock | dry crock |
|---|---|---|---|
| white | 3.0 | 4.5 | 4.5 |
| gold | 4.0 | 4.5 | 4.5 |
| Lt. green | 3.0 | 4.5 | 4.5 |
| Dk. green | 3.5 | 4.5 | 4.5 |
| Lt. blue | 3.0 | 4.5 | 4.5 |
| Navy | 4.5 | 4.0 | 4.0 |
| Pink | 3.0 | 4.5 | 4.5 |
| Red | 4.5 | 3.0 | 3.0 |

Grades were based on a grey scale rating of 1–5 with 5 being "no change." Xenon test was performed to AATCC test method 16-1990. Wet and dry crock test were performed to AATCC test method 8-1989. Grey scale rating was performed to AATCC Evaluation Procedure 1.

As shown from the above results, rugs woven from yarn prepared from the dyeable polyolefin fiber exhibit excellent dye uptake and color fastness. Such results translate into a polyolefin rug that exhibits a wool-like appearance.

It will be apparent to those skilled in the art that various modifications and variations can be made in the present invention without departing from the scope or spirit of the invention. Other embodiments of the invention will be apparent to those skilled in the art from consideration of the specification and practice of the invention disclosed herein. It is intended that the specification and examples be considered as exemplary only, with the true scope and spirit of the invention being indicated by the following claims.

What is claimed is:

1. A rug exhibiting a wool-like appearance made by the process comprising the steps of:
   a. extruding a dyeable polyolefin resin comprising the reaction product of a polypropylene and an ethylene alkyl acrylate copolymer to provide an extruded fiber;
   b. drawing the extruded fiber by conveying the fiber among a system of unheated and heated godets;
   c. crimping the drawn fiber by passing the fiber into a texturing jet utilizing hot air;
   d. twisting at least two separate drawn and crimped fibers to provide a multi-ply carpet face yarn wherein the yarn is from about 1000 to about 8000 denier and has about 2 to about 7 twists per inch;
   e. heat-setting the multi-ply yarn;
   f. dyeing the multi-ply yarn using a space-dyeing process; and
   g. weaving the dyed yarn into a rug;

thereby providing a rug with a wool-like appearance.

2. The rug of claim 1 wherein the dyeable polyolefin resin comprises a polyester, a hydrophilic modifier, or a polyamide.

3. The rug of claim 1 wherein a color concentrate is dosed into the extruder along with the resin.

4. The rug of claim 1 wherein the extruding step comprises the steps of:
   a. conveying the resin through the extruder wherein the resin is passed through a series of zones comprising increasing temperatures of from about 195° C. to about 225° C.;
   b. passing the resin through a multitude of spinnerettes comprising a multiplicity of holes configured in a delta shape wherein the spinnerette is adjusted to produce a number of extruded fibers; and
   c. cooling the extruded fibers by passing the fibers through an air stream.

5. The rug of claim 1 comprising applying a finish to the extruded fiber comprising about 1.0 to about 1.5% by weight of the fiber.

6. The rug of claim 1 wherein the drawing step comprises
   a. feeding the fiber onto at least one first unheated godet wherein the fiber is drawn around the first godet;
   b. feeding the fiber onto at least one heated second godet wherein the second godet is operated at a temperature of about 80° C. to about 90° C. and wherein the fiber is drawn around the second godet;
   c. feeding further the fiber onto at least one heated third godet wherein the third godet is operated at a temperature of about 120° C. to about 130° C. and wherein the fiber is drawn around the third godet; and d. feeding the fiber on to at least one unheated fourth godet on to which the fiber is wrapped;

wherein the drawn fiber has a draw ratio of less than about 3.0.

7. The rug of claim 6 wherein the finished drawn fiber has a draw ratio of about 2.4.

8. The rug of claim 1 wherein the crimping step comprises passing the drawn fiber into a hot air texturing jet to provide a bulked fiber.

9. The rug of claim 1 wherein the twisting step comprises threading at least two separate crimped fibers onto a twister device wherein the tension on each fiber is set to about 575 to about 625 grams and wherein the twisted yarn is fed onto a spindle traveling at a speed of about 5000 to about 8000 revolutions per minute.

10. The rug of claim 1 wherein the yarn from the twisting step is formed from at least 2 fibers and the yarn has a size of about 1400 to about 1500 denier and has about 3 to about 6 twists per inch.

11. The rug of claim 1 wherein the multi-ply yarn comprises fiber formed from a dyeable polyolefin fiber and at least one other fiber of a standard polyolefin, polyamide (nylon), polyester or wool.

12. The rug of claim 1 wherein the heat-setting step comprises:
   a. feeding a package of twisted yarn onto a conveyor belt;
   b. conveying the yarn through a pre-steamer station operating at a temperature of about 90 to about 110° C. for less than about 0.5 minute;
   c. conveying further the yarn to a heat-set tunnel operated at a temperature of about 100 to about 150° C. and a pressure of about 2 to about 3 bar;
   d. cooling the yarn; and
   e. winding the yarn onto a spool to form a package.

13. The rug of claim 1 wherein the dyeing step comprises:
   a. coiling a multiplicity of yarn;
   b. passing the coiled yarn over a multiplicity of dye pans;
   c. applying at least one dye along the length of the coiled yarn at pre-determined distances;
   d. rinsing any excess dye from the surface of the coiled yarn; and
   e. setting the dye to the surface of the yarn.

14. A process for making a rug with a wool-like appearance comprising the steps of:
   a. extruding a dyeable polyolefin resin comprising the reaction product of a polypropylene and an ethylene alkyl acrylate copolymer to provide an extruded fiber;
   b. drawing the extruded fiber by conveying the fiber among a system of unheated and heated godets;
   c. crimping the drawn fiber by passing the fiber into a texturing jet utilizing hot air;
   d. twisting at least two separate drawn and crimped fibers to provide a multi-ply carpet face yarn wherein the yarn is from about 1000 to about 8000 denier and has about 2 to about 7 twists per inch;
   e. heat-setting the multi-ply yarn;
   f. dyeing the multi-ply yarn using a space-dyeing process; and
   g. weaving the yarn into a rug;

thereby providing a rug with a wool-like appearance.

15. The process of claim 14 wherein the dyeable polyolefin resin comprises a polyester, a hydrophilic modifier or a polyamide.

16. The process of claim 14 wherein the extruding step comprises:
   a. conveying the resin through the extruder wherein the resin is passed through a series of zones comprising increasing temperatures of from about 195° C. to about 225° C.;
   b. passing the molten resin mixture a multitude of spinnerettes comprising a multiplicity of holes configured in a delta shape wherein the spinnerette is adjusted to produce a number of extruded fibers; and
   c. cooling the extruded fibers by passing the fibers through an air stream.

17. The process of claim 14 wherein the drawing step comprises:
   a. feeding the fiber onto at least one first unheated godet wherein the fiber is drawn around the first godet;
   b. feeding the fiber onto at least one heated second godet wherein the second godet is operated at a temperature of about 80° C. to about 90° C. and wherein the fiber is drawn around the second godet;
   c. feeding further the fiber onto at least one heated third godet wherein the third godet is operated at a temperature of about 120° C. to about 130° C. and wherein the fiber is drawn around the third godet; and
   d. feeding the fiber on to at least one unheated fourth godet on to which the fiber is wrapped wherein the drawn fiber has a draw ratio of less than about 3.0.

18. The process of claim 14 wherein the heat-setting step comprises:
   a. feeding a package of twisted yarn onto a conveyor belt;
   b. conveying the yarn through a pre-steamer station operating at a temperature of about 90 to about 110° C. for less than about 0.5 minute;
   c. conveying further the yarn to a heat-set tunnel operated at a temperature of about 100 to about 150° C. and a pressure of about 2 to about 3 bar;
   d. cooling the yarn; and
   e. winding the yarn onto a spool to form a package.

* * * * *